Jan. 17, 1967  M. H. COMER  3,298,169
METHOD FOR PROCESSING YARN
Filed Dec. 28, 1964  3 Sheets-Sheet 1
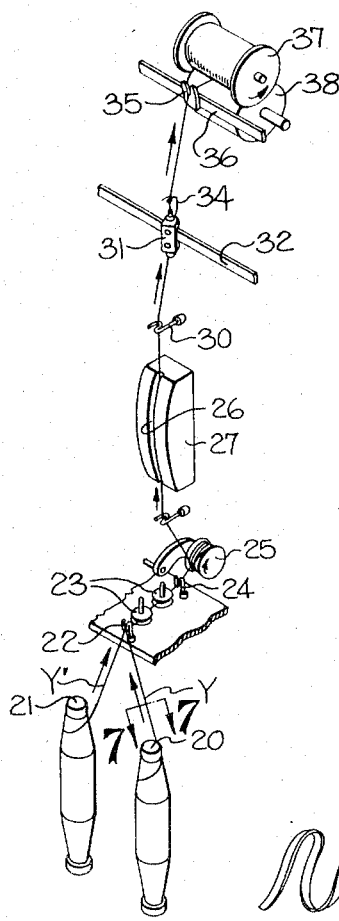
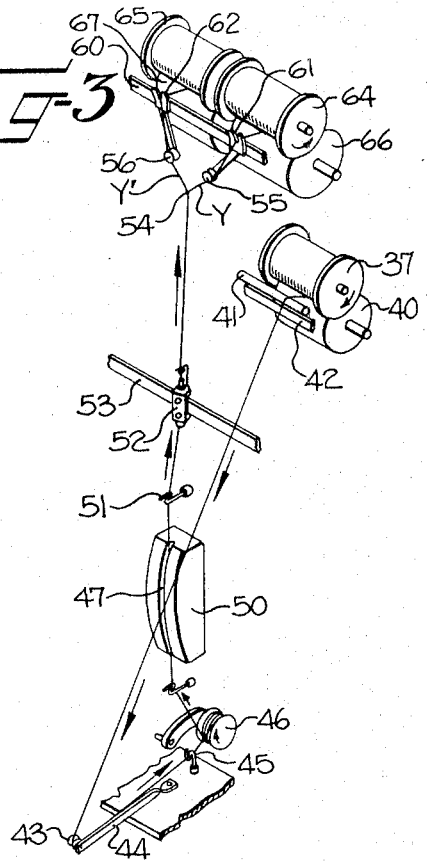
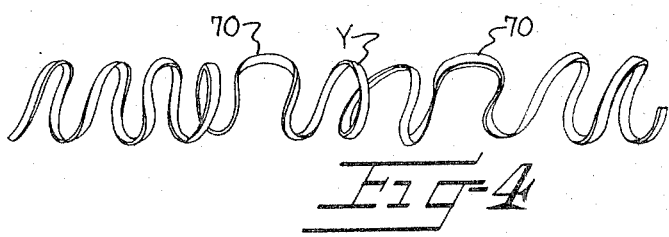
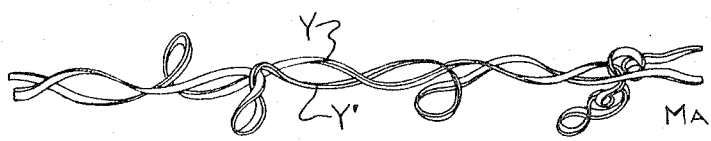
INVENTOR
MARVIN H. COMER Jan. 17, 1967  M. H. COMER  3,298,169
METHOD FOR PROCESSING YARN
Filed Dec. 28, 1964  3 Sheets-Sheet 2

INVENTOR
MARVIN H. COMER

Jan. 17, 1967     M. H. COMER     3,298,169
METHOD FOR PROCESSING YARN
Filed Dec. 28, 1964     3 Sheets-Sheet 3
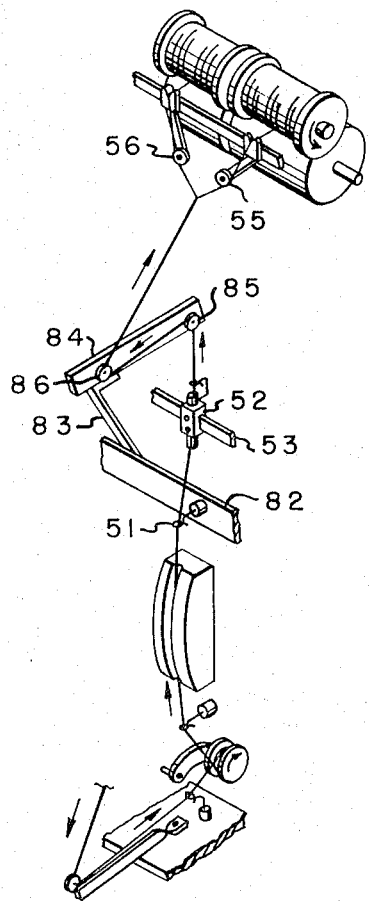
FIG.-13-
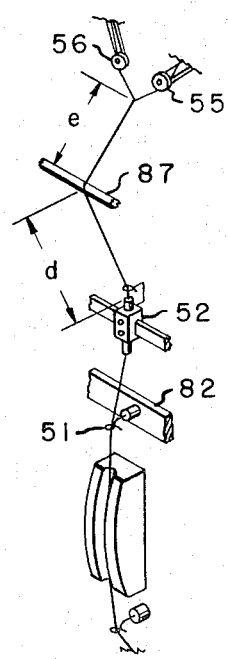
FIG.-14-
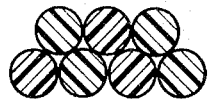
FIG.-15-
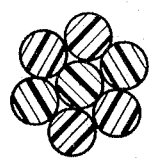
FIG.-16-
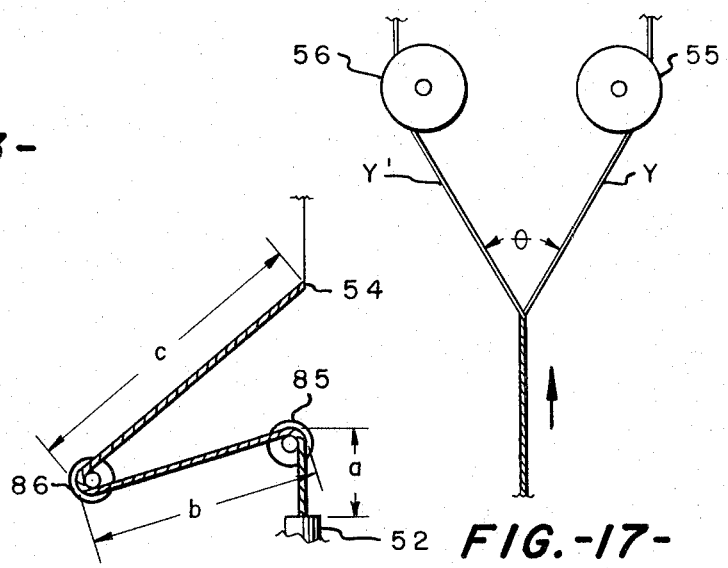
FIG.-18-
FIG.-17-
INVENTOR.
MARVIN H. COMER
BY
John C. LaPrade
ATTORNEY 3,298,169
METHOD FOR PROCESSING YARN
Marvin H. Comer, Burlington, N.C., assignor to Deering Milliken Research Corporation, Spartanburg, S.C., a corporation of Delaware
Filed Dec. 28, 1964, Ser. No. 421,186
15 Claims. (Cl. 57—157)

This application is a continuation-in-part of application Serial No. 137,382, filed September 11, 1961, for Method of Processing Monofilament Yarn, now Patent No. 3,162,995.

This invention relates generally to an improved method of processing monofilament and multifilament thermoplastic yarn to produce a stretchable yarn having balanced torque and more particularly to a method of producing a stretchable yarn, such as nylon, which is characterized by a series of small closely spaced substantially uniform spring-like helical coils and in which the rotational direction of the coils reverses periodically to thereby balance the torque in the yarn and make it particularly adaptable for the single-feed knitting of stretchable articles of clothing, such as ladies' shear hosiery and the like.

There are many known methods of processing a normally non-stretchable thermoplastic yarn, such as nylon, to produce a yarn which is stretchable or a yarn which forms stretchable fabric when knit. For example, monofilament nylon yarns have been highly twisted, heat-set and untwisted to produce a lively or torque yarn which causes the knit stitches of the fabric to distort and produce elasticity in the fabric. Monofilament thermoplastic yarns also have been crimped by means of gears, crimping wheels or the use of a stuffing box. Curl or crimp has also been imparted to yarn by drawing it over a heated sharpened blade, or around heated cylindrical objects. It is also known to twist multifilament yarns together and heat-set them in the twisted-together condition to form helical curls or coils therein.

While the above methods are capable of producing lively, crinkled, curly or coiled yarns which may be knit to form fabric having elastic characteristics, there are various disadvantages and problems with known yarn and methods. For example, the heat-set and twisted yarn as well as that drawn around a cylindrical object has torque or liveliness which must be balanced and controlled. The gear crimped yarn is distorted in only one plane and lacks desirable bulk. Yarns crimped in a stuffing box lack uniformity of crimp size and uniform setting.

While edge crimped yarn has balanced torque, uniformity of coil size is difficult to maintain because of variations in the tension of the yarn and the blade cannot be maintained at a constant degree of sharpness. Also, in this process, portions of the yarn which engage the blade are subjected to more heat, and consequently the yarn is not uniformly heat-set throughout its diameter and the curls or coils can be removed if the yarn is placed under very high tension which is close to the breaking point of the yarn. Additionally, the drawing of the yarn over the sharpened blade must be continuous and, if stopped for any reason, such as yarn breakage, the processed yarn must be doffed and cannot be knotted and continued after yarn breakage. Hosiery knit of this type yarn requires excessive agitation in the finishing in order to fully develop the curls or coils.

It has also been proposed that thermoplastic yarns be subjected to first and second false twisting operations to produce a torque-free or balanced torque stretchable yarn which may be utilized to knit fabric in a single-feed manner. These two false twisting operations are superimposed in opposite directions to balance the torsional stress in the yarn and produce a yarn which has a generally wavy appearance. However, this procedure has not been utilized to produce a helical, spring-like yarn having closely spaced coils and balanced torque.

With the foregoing in mind, it is a primary object of the present invention to provide an improved method of producing an improved stretchable monofilament or multifilament thermoplastic yarn which has balanced torque and which is suitable for single-feed knitting of ladies' shear hosiery and the like wherein the torque of the finished hosiery is completely balanced. The yarn produced in accordance with the present method is characterized by a series of helical, spring-like coils of highly convoluted configuration which are of substantially uniform size and configuration. The coils are closely spaced, for example, in 15 denier monofilament yarn there are on the order of 75 loops per inch when the yarn is relaxed and approximately 85 loops per inch when placed in 212° F. water. In 40 denier 7 filament yarn, for example, there are on the order of 41 to 48 loops per inch when placed in 212° F. water. Yarn produced in accordance with the invention is not subject to the disadvantages of the prior art yarns produced by the above-noted methods.

It is another object of the present invention to provide a novel method of producing a yarn of the type described which may be easily knit into ladies' sheer hosiery and the like without requiring any changes or special procedures during the knitting and finishing of the hosiery knit therefrom. The uniform loops or coils of the yarn provide uniform stretch in the hosiery and give a bulky appearance with the relaxed and finished fabric having a somewhat pebbled or creped appearance.

It is still another object of the present invention to provide a novel method of producing a yarn of the type described in which the spring-like coils of the yarn are permanently set in the yarn and although these coils can be removed or straightened out by applying tension to the yarn, the coils will return to substantially their original relaxed condition after tension is released from the yarns, even when tension is applied which approaches the breaking point of the yarn.

It is another object of the present invention to provide a novel method of producing a yarn of the type described which can be economically carried out to produce the yarn at a rapid production rate to thereby lower the cost of the yarn.

It is a still further object of the present invention to provide a novel method for producing a yarn of the type described above.

It is a still further object of this invention that these novel processes result in new and unexpected economic results in the production of both monofilament and multifilament yarns.

It is another object of the invention to provide a novel apparatus for producing a yarn of the type described.

The foregoing objects as well as other objects are generally accomplished by false twisting a pair of thermoplastic yarns in a first direction at a relatively high number of turns, while subjecting the same to a relatively high temperature, then false twisting the same pair of yarns in an opposite direction while reducing the number of turns by approximately one-third and the amount of heat by substantially one-fifth in the case of yarns in the range of 7 to 30 denier and by substantially one-tenth in the case of yarn in the range of above 30 denier i.e. 30–300 denier during the second false twisting operation, then separating the yarns and winding the separated yarns onto separate take-up bobbins. In the processing of higher denier yarn it should be understood that the temperature in each false twisting step can be varied considerably and can be higher in the second step than in the first step.

It has been found that in the false twisting of thermoplastic yarn of a denier on the range of 7 to 30 denier the false twisting in the first direction at a relatively high number of turns, within the range of 85 to 126 turns per inch. In this same first false twisting step of a yarn in the range of above 30 denier it is preferable to subject such thermoplastic yarns to a false twisting in the first direction at a relatively high number of turns within the range of 60 to 90 turns per inch. In the following this stated process the same pair of yarn ends are then false twisted in the opposite direction while reducing the number of turns by approximately one-third. In this false twisting step a pair of yarns if false twisted in opposite direction the number of turns for 7–30 denier yarn being in the range of 57 to 84 turns per inch while a yarn in the range of above 30 denier should be false twisted between 40 and 60 turns per inch.

In the practice of the aforesaid false twisting process, it has been found that it is necessary to maintain a certain minimum linear distance through which the two ends of either low denier or high denier monofilament or multifilament yarns must pass after emerging from the false twist spindle before the yarns are separated. It is necessary to maintain this minimum critical distance or length of path of the yarn in order to run efficiently and avoid excessive breakage. If the minimum distance is not maintained the yarn, in certain cases, will not run. This minimum distance has been found to vary considerably depending upon whether the yarn is in the 7–30 denier range or on the other hand it is in the range of above 30 denier. In connection with these minimum distances, it has also been found that the angle between the two ends of yarn at their point of separation is related on the length of the yarn path between the false twist spindle and the point where the two ends of yarn are separated. This angle of separation or split-out angle has been found to be of great importance in practicing the process of this invention. It has also been found that these angles will vary considerably depending upon the denier of the yarn process.

Some of the objects of the invention having been stated and a general description of the invention having been given, other objects will appear as the description proceeds and as the details of the invention are more fully explored in connection with the accompanying drawings in which:

FIGURE 1 is a somewhat schematic isometric view of the preferred type of apparatus for carrying out the first false twisting operation of the present invention;

FIGURE 2 is a greatly enlarged fragmentary view of the pair of strands of monofilament yarns after the first false twisting operation, the yarns being in partially relaxed position and each strand having a strong tendency to kink and curl upon itself, due to the torsional stress therein;

FIGURE 3 is a somewhat schematic isometric view of the preferred type of apparatus for carrying out the second false twisting operation and illustrating the manner in which the two separate strands on ends of yarn are separated and then taken up on separate take-up bobbins.

FIGURE 4 is a greatly enlarged fragmentary view of one of the yarns in relaxed condition after it has been false twisted in the second operation;

FIGURE 13 is a somewhat schematic isometric view of one type of preferred apparatus for carrying out the second false twisting operation illustrating a special modification that is utilized in obtaining the proper length of yarn path and angle of separation in accordance with the present invention;

FIGURE 14 is a somewhat schematic isometric view of another type of preferred apparatus for carrying out the second false twisting operation illustrating a special modification that is utilized in obtaining the proper length of yarn path and angle of separation in accordance with the present invention;

FIGURE 15 is a greatly enlarged transverse sectional view through a single strand of multifilament yarn prior to processing in accordance with the present invention;

FIGURE 16 is greatly enlarged transverse sectional view through a single strand of multifilament yarn after applying turns of twist;

FIGURE 17 is a plan view showing a typical angle of separation for a relatively high denier yarn;

FIGURE 18 is a schematic showing the path of the yarn in FIGURE 13 and the various components that determines the length of the path between the false twist spindle and the point of separation of one end of yarn from the other.

Figure 5:
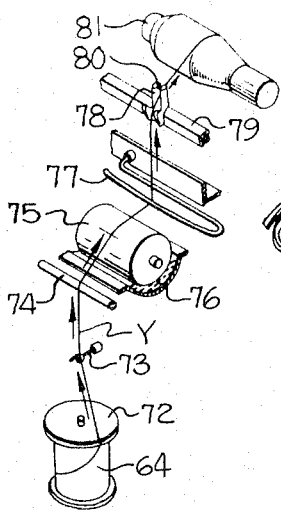
FIGURE 5 is a somewhat schematic isometric view of the preferred type of winding machine which is utilized to transfer the processed yarn of the present invention from the take-up bobbins to suitable bobbins for knitting.

Generally, the present invention is particularly concerned with a method of processing those thermoplastic yarns which fall within the range of from about 7 denier to 100 denier and which are most commonly utilized to knit ladies' sheer hosiery and the like. For purposes of describing the present invention the yarn processed in accordance therewith is best divided into two groups. In the first group is that which falls in the class off yarn having a denier in the range of 7 to 30 denier. This yarn will usually, in most cases, be a monofilament yarn. However, this is not necessarily the case and includes multifilament yarn that falls within this range of denier. In the second group is that yarn which is within the range above 30 denier. This yarn will, of course, usually be a multifilament yarn. However, this is not necessarily the case and it is intended that this group also include monofilament yarn. For the sake of convenience these groups hereinafter will be referred to as the low denier yarn i.e. 7 to 30 denier and the high denier yarn i.e. 30 denier and above.

In the first false twisting operation, the number of turns imparted to low denier yarn is within the range of from 85 to 126 turns per inch in one direction, and in the second false twisting operation, the number of turns is within the range of from 57 to 84 turns per inch in the opposite direction. The number of turns imparted to high denier yarn in the first false twisting operation should be within the range of from 60 to 90 turns per inch in one direction and in the second false twisting operation in the opposite direction, the number of turns should be reduced by approximately one-third to be in the range of 40 to 60 turns per inch. The low denier false twisted yarns are normally subjected to a temperature within the range of from 415° F. to 425° F. in the first false twisting operation while these low denier yarns are subjected to a temperature of from 340° F. to 360° F. in the second false twisting operation. The false twisted high denier yarns are subjected to a temperature within the range of 370° F. to 440° F. the more preferred range being 410° to 440° F. in the first false twisting operation, while the high denier yarns in the second false twisting operation are subjected to a temperature in the range of 350° to 415° F., the more preferred range being a temperature from 375° to 405° F. In the practice of this invention it has been found, as shown in FIGURE 3, that the distance between the exit point on the false twist spindle 52 and the point of separation of the two yarns 54 is a critical distance and that in order to successfully practice the invention in its best form, it is necessary that this distance be maintained at a minimum of 17 inches in the processing of low denier yarn, as defined above and at a minimum of 35 inches in the processing of high denier yarn, as defined above. This minimum length of path is also described as the total of the distances $d$ and $e$ in FIGURE 14, and the total of $a$, $b$ and $c$ in FIGURE 18. In order to practice the invention most effectively it is preferred that the minimum distance for the length of path between the top of the false twist spindle and the point of separation at 54 should be in the preferred range of 20 to 28 inches for the low denier yarn and a minimum distance in the preferred range of 57 to 66 inches for the high denier yarns.

After the pair of thermoplastic yarns have been processed through the first and second false twisting operations and separated, they each have a series of convolutions or coils which are spring-like in appearance and the coils or loops are of uniform size with an adjacent group of the loops being formed in one direction and the next group of loops being formed in an opposite direction, the number of loops in each group varying before a reversal point is reached. After the yarns have been processed through the first false twisting operation, each filament is very lively and contains a great deal of torque and will kink and twist upon itself when relaxed, however, after the yarn is processed through the second false twist operation, the torque is balanced and contains uniform loops which periodically reverse their direction along the length of the yarn. When this yarn is placed under longitudinal tension, close to the breaking point, the loops will straighten out. However, when the tension is released, they will return and the loops or coils are not materially affected but return to substantially their original configuration. When the yarn is relaxed, it will not kink and curl upon itself because the torque is balanced. Immediately after processing, the relaxed yarn is elastic and stretchable and the loops are closely spaced—about an average of 75 coils per inch for 15 denier monofilament yarn. It has been found that after this yarn is knit into a fabric such as ladies' sheer hosiery and then finished in the usual manner, even a greater amount of elasticity is developed. This has been demonstrated by subjecting an untensioned skein of the yarn to boiling water for a period of three minutes. After this water treatment and relaxing operation, it has been found that the coils are reduced in size so that there is an average of 85 coils per inch for 15 denier yarn.

During the knitting operation, the yarn is maintained straight and after the knit loops are shed from the needles, the stitch loops are somewhat distorted in an irregular manner as the yarn attempts to return to the original coiled position. After the knit fabric is finished, the stitch loops are very distorted and some of the stitch loops will distort toward one face of the fabric, others will distort or bow or bend toward the opposite face of the fabric, while other stitch loops will distort in opposite directions parallel to the surfaces of the fabric so that the relaxed fabric has a somewhat pebbled or creped bulky appearance. However, when the fabric is stretched, as when a hose is worn on the leg, the distorted stitch loops and the yarns forming the same will substantially straighten and the stitches will assume their normal shape, thereby presenting a sheer appearance when worn on the leg.

In accordance with the present invention it has also been determined that the critical length of yarn path as described in the processing of both high denier and low denier yarn is related to the angle of separation. The angle of separation which is referred hereinafter as the split-out angle, best shown in FIGURE 17, follows the second false twist operation is important in obtaining good yields of satisfactory yarn. The relationship of the split-out angle and the length of path is inverse, i.e., as the length of path increases the split-out angle decreases. The range of split-out angles which applicant has determined to be of most importance in terms of improved operating technique and to avoid excessive breakage of yarn has, generally speaking, been found to be in the range of 60 to 130° for low denier yarn wherein the denier will vary between 7 and 30. The angle of split-out for the high denier yarn should vary between 40° and 100°. The preferred angle of split-out for low denier yarn should vary between 70° and 100°, while the preferred angle of split-out for the high denier yarn, as defined should be in the range of 50° to 90°. The preferred split-out angles for yarns in the 7 to 100 denier range are set forth in the follwing table:

TABLE A.—PREFERRED SPLIT-OUT ANGLES

| Denier: | Angle range (degrees) |
|---|---|
| 7 | 100–130 |
| 10 | 90–125 |
| 12 | 80–120 |
| 15 | 75–110 |
| 20 | 70–100 |
| 30 | 65–95 |
| 40 | 60–90 |
| 50 | 55–85 |
| 60 | 50–80 |
| 70 | 45–75 |
| 80 | 40–70 |
| 100 | 35–65 |
| Above 100 | 50–60 |

These split-out angles may be provided for example by varying the length of the arm 84 in FIGURE 13 or by moving the bar 87 in FIGURE 14 so as to increase or decrease the length of path.

There are several known types of thermoplastic yarns which are commercially available and which may be rendered stretchable according to the present method and while the present application is particularly concerned with nylon, other yarns having similar characteristics may be utilized. Yarns, such as nylon, are substantially round or circular in cross-section before processing and it has been found that the processing of these yarns in accordance with the present method causes the same to become flattened or somewhat rectangular in cross-section. It is believed that the yarns are flattened because they are initially twisted together, to a relatively high degree and heated close to the melting point so that they flatten against each other. Also, a low denier yarn such as a 15 denier monofilament nylon yarn is contracted about 14% due to the high twist, and has about 4% shrinkage during this process, while a 40 denier, 7 filament nylon yarn will shrink approximately 4.9%.

Figure 7:
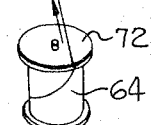
FIGURE 7 is a greatly enlarged transverse vertical sectional view through a monofilament thermoplastic yarn before it is processed, being taken along the line 7—7 in FIGURE 1.

Referring to the drawings, FIGURE 1 schematically illustrates the apparatus used to false twist the yarns in the first operation. The drawing shows only one section of a slightly modified conventional false twist machine of the type which is known as the model 551 Superloft machine manufactured by Leesona Corporation. A pair of monofilament thermoplastic yarns Y and Y' are withdrawn from respective yarn supply pirns 20 and 21 which are suitably supported on the lower portion of the machine. The yarns Y and Y' are in the condition received from the yarn producer and are withdrawn directly from the pirns 20 and 21 on which the yarn is wound by the producer. As shown in FIGURE 7, the yarns are round in cross-section as they are drawn from the pirns 20 and 21, before processing.

In processing of multifilament yarns according to the present invention it is necessary to take the multifilament yarns which have a generally flat cross-section as shown in FIGURE 15 and twist it until a generally round transverse cross-sectional configuration, as shown in FIGURE 16 is obtained prior to the joining of the two ends of yarn. The number of turns or twists necessary to give the multifilament yarn this round cross-section is usually in the range of 5 to 15 turns These number of turns, however, may be varied accordingly in so long as a multifilament yarn of a generally round cross-section is obtained prior to the joining of the two yarns as shown in FIGURE 1 at 22, 23 and 24.

The pair of yarns Y and Y' pass upwardly through a common guide eye 22 where they are joined together and guided through a pair of tension disks 23. The yarns then pass beneath a yarn guiding element 24 and then are wound around a driven feed roll 25. From the feed roll 25, the yarns Y and Y' extend upwardly and pass through a yarn receiving groove 26 in a heater block 27. From the heater block 27, the yarns Y and Y' pass over a yarn guide element 30 and into a false twist spindle 31 which is rotated by a belt 32.

Figure 9:
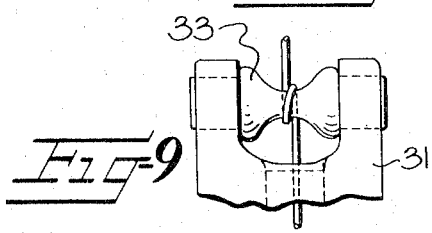
FIGURE 9 is a greatly enlarged elevation of the upper end of the false twist spindle used in processing the yarn.
Figure 10:
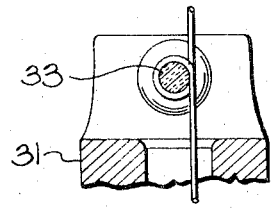
FIGURE 10 is a vertical sectional view taken through the center of that portion of the false twist spindle shown in FIGURE 9.

As shown in FIGURES 9 and 10, the upper end of the false twist spindle 31 is provided with a small exit pin 33 which is tapered inwardly toward the center from each end and which is formed of a hard ceramic material, such as Alsimag. The center diameter of the pin 33 is small, on the order of .030 of an inch. As the yarns leave the exit pin 33 of the false twist spindle 31, they are passed through a guide eye 34 and through a guide block 35 which is suitably supported on a traversing rod 36. From the guide block 35, the yarns are wound onto a take-up bobbin or spool 37 which is driven by a roller 38.

During this first false twisting operation, the machine is set up to drive the false twist spindle 31 at a speed of 147,000 revolutions per minute by the belt 32. The speed of the feed roll 25 and the take-up roll 38 is adjusted to impart between 85 and 126 turns per inch of false twist to the yarns in one direction. The temperature of the heater block 27 is maintained between 415° F. and 425° F. for a low denier yarn and 370° F. to 440° F. for the high denier yarn, the tension disks 23 are adjusted to apply substantially 3 to 4 grams of tension on the yarns Y and Y' after they are drawn from the supply pirns. From 6½ to 7 grams of tension is maintained in the yarns as they pass through the heater block 27 and approximately 8 to 14 grams of tension is maintained in the yarns as they are wound onto the take-up spool 37.

Also, the speed of the feed roll 25 and the take-up roll 38 are adjusted to apply from 0% overfeed to approximately 6.2% overfeed. It is preferred that the sprocket gear settings on the let off rolls be adjusted so that a 0% overfeed condition is maintained.

Figure 8:
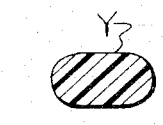
FIGURE 8 is a greatly enlarged transverse sectional view through the yarn after it has been processed in accordance with the present invention, illustrating the flattened condition of the yarn.

A close inspection of the yarns Y and Y', following the first false twist operation (FIGURE 2), reveals that they have become somewhat flattened or ribbon-like (FIGURE 8) and each yarn contains a great deal of torsional stress so that it tends to curl and kink upon itself when partially relaxed, as shown in FIGURE 2. If the pair of strands Y and Y' were completely relaxed in FIGURE 2, they would completely twist together since each of the yarns is very lively. The yarns shown in FIGURE 2 are somewhat kinked because they are in partially relaxed condition, however, when these yarns are wound onto the take-up spool 37, with from 10 to 14 grams of tension, they are maintained in substantially a straight condition.

In the second false twisting operation, the take-up spool 37 is used as the supply spool on a second model 551 Superloft machine which has been slightly modified to again false twist the yarns. As shown in FIGURE 3, the spool bobbin 37 is rotated by a drive roll 40 as the yarns Y and Y' are withdrawn therefrom and guided over a bar 41 which has been attached to and spaced above the usual traversing bar 42 of the machine. The yarns are guided downwardly from the bar 41 and pass beneath a grooved guide pulley 43 which is supported on the forward end of a support arm 44. The yarns are guided from the pulley 43, beneath a yarn guide element 45 and wrapped around a feed roll 46. From the feed roll 46, the yarns are passed upwardly through a yarn receiving groove 47 in a heater block 50. From the heater block 50, the yarns pass upwardly beneath a yarn guide element 51 and through a false twist spindle 52 which is rotated by a driving belt 53.

As the yarns leave the false twist spindle 52, they are separated, as at 54, and engage spaced apart grooved guide pulleys 55 and 56 which are supported on and beneath a conventional traversing bar 60. From the pulleys 55 and 56, the yarns Y and Y' pass through guide blocks 61 and 62 supported on the traversing bar 60 and they are then wound onto separate respective take-up bobbins or spools 64 and 65 which are rotated by respective driving rolls 66 and 67.

In this second false twisting operation, the machine is set up to drive the false twist spindle 52 at a speed of 90,000 revolutions per minute by the belt 53. The speed of the rolls 40, 46, 60 and 67 is adjusted to impart between 57 and 84 turns per inch of false twist to the yarns in a direction opposite the twist imparted in the first false twisting operation while providing from 0% to 6.2% overfeed. Also, the heater block temperature is maintained between 340° F. and 360° F. for low denier yarn and between 375° F. and 405° F. for high denier yarn during this second false twisting operation. The machine is set up to provide 3 to 4 grams of tension in the yarn from the supply spool 37 to the feed roll 46, from 2 to 3 grams at the heater block 50, from 12 to 14 grams above the false twist spindle 52 and from 10 to 12 grams as the yarns are wound onto the separate take-up spools 64 and 65. As the yarns pass through the second false twisting spindle 52, they are again passed around an exit pin which is similar to the exit pin 33, shown in connection with the false twisting spindle 31 used in the first false twisting operation.

Referring to FIGURE 4, the yarn strand Y is shown after it is removed from the take-up spool 64 and allowed to relax. It will be noted that the coils are substantially uniform in size and the coils adjacent opposite ends of the yarn shown in FIGURE 4 rotate in one direction and then reverse their directions, at the points indicated at 70, and the coils in the medial portion of the yarn shown in FIGURE 4 rotate in the opposite direction.

This reversal of the direction of rotation of the coils in the yarn occurs periodically throughout the length of the yarn and the overall torque of resulting yarn is balanced so that it can be knit single-feed to form ladies' sheer hosiery and the like.

After the yarns are wound onto the spools 64, 65 they are placed on a suitable winding machine, such as a Speedex machine of the type manufactured by Fletcher Works of Cheltenham, Pennsylvania. The spool 64 is shown in position at the lower end of the winding apparatus (FIGURE 5) and is provided with aluminum guide cap 72 which is positioned to cover the upper end of the spool 64. The yarn Y is drawn upwardly from the spool 64 and passes through a guide eye 73, over a guide rod 74, over a revolving applicator 75 which is running in a trough 76 filled with a light-weight oil which adds to the evenness of the curls, the oil being of a type that allows the yarn to relax more readily to its position of the originally set curls.

The yarn Y passes from the roll 75 through a guide wire member 77 and upwardly through a guide block 78 which is supported on a traversing bar 79. The yarn then passes through the slot of a slub catcher blade 80 which is supported on the bar 79 behind the guide block 78. The yarn Y is then wound onto a suitable tube 81 which is then used as a supply bobbin on the knitting machine. The winding operation shown in FIGURE 5 is carried out to lubricate the yarn and to place it on a supply tube by what is known as a filling wind so that it may be easily withdrawn during knitting on a circular knitting machine. In the practice of the present invention two ends of yarn, comprising mono or multifilament yarn, are false twisted. While it is contemplated to false twist any multifilament yarn the following multifilament yarns are specifically included: 15 denier, 3 filament; 20 denier, 7 filament; 30 denier, 10 filament; 40 denier, 7 filament; 40 denier, 10 filament; 40 denier, 13 filament; 50 denier, 17 filament; 60 denier, 20 filament; 17 denier, 17 filament; and 100 denier, 34 filament. Although nylon is the preferred material any similar material having analogous properties will work and are included within the scope of this application.

FIGURE 13 illustrates a modified false twist apparatus. The false twist apparatus may, for example, be a modified model 551 Superloft machine made by the Leesona Corporation or other conventional false twist equipment. In this modified apparatus the length or path of the yarn between false twist spindle and the point of separation of the two ends of yarn, hereinafter referred as the length or path is lengthened by this modification to the required distance.

A guide eye 51 mounted on support member 82 guides the yarn from the heater block as it progresses to guide pulleys 85 and 86 on arm 84, arm 84 being mounted on a bracket that is supported by support member 82. As the yarn progresses from guide pulley 86 it is separated at point 54 and thereafter each end engages spaced apart guide pulleys 55 and 56 which are supported on and beneath a conventional traversing bar 60.

As shown in FIGURE 13 the arm 84 is the means used to vary the length of path of yarn between the false twist spindle and the point 54 in FIGURE 3. The size of the angle of separation or split-out angle is a function of the length of path and therefore the arm 84 or the bar 87 in FIGURE 14 controls and/or varies the size of angle $\theta$ at 54. The length of arm 84 will vary depending upon the requirements and may be made in telescopic form so that the length may be readily changed. The position of bar 87 may be changed in order to change lengths $d$ and $e$. In applicant's preferred embodiment the arm 84, which is used to modify the Leesona 551 Superloft machine may be of an optional length, depending upon the split-out angle that is desired and so long as the required minimum path length is obtained.

In the preferred embodiment where a low denier yarn is being processed it is preferable that the arm 84 vary in length between 17 and 23 inches, when used to modify the Leesona 551 Superloft machine. On the other hand, in the processing of high denier yarn it is preferred that the arm length vary between 22 and 32 inches. It is also possible that in the higher denier multifilament operation wherein the treatment of high denier multifilament yarn is desirable the arm length can vary between 32 and 40 inches. It is, of course, to be understood that other false twist machines that are equivalent or analogous to Leesona's 551 Superloft machine can be so modified so as to provide the critical length of yarn path and the proper split-out angles as set forth according to the present invention.

In FIGURE 14, the length path is that total distance $d$ and $e$ and the length of path being increased by a conventional chrome bar 87. It is of course, to be understood that conventional chrome bar 87 may be replaced by 3 or more bars arranged so as to give the yarn above a false twist spindle 52 a Z or inverted Z path when viewed in cross-section. The cross-section of the path as defined by supported guide pulleys or bars is of little importance so long as the length of path and the split-out angle are maintained within the limits prescribed above.

In the processing of multifilament yarn of any denier, even in excess of 100 denier, in accordance with the present invention, such yarn generally has a flat or oblong configuration when viewed in cross-section as shown in FIGURE 15 it is necesasry to preliminarily apply an adequate number of turns of twist per inch to such flat or oblong manufacturer's yarn so as to impart a generally round cross section as shown in FIGURE 16. The number of turns of twist per inch that are necessary to impart a round configuration when viewed in cross-section is usually in the range of 5 to 15 turns of twist per inch. In the processing of high denier yarn, particularly multifilament yarn two ends of a multifilament yarn are first twisted on an Atwood model 100 Winder Spinner Machine, made by the Leesona Corporation so as to impart, for example, 10 turns of twist to each end. In this modified Atwood model 100 Winding Machine, made by Leesona Corporation the two ends of multifilament yarn can be joined together and laid side by side on a take-up bobbin. This bobbin is then used, as shown, in FIGURE 1 to feed the two joined multifilament yarns to the first false twist operation and can be fed directly to the heater block 27 as shown in FIGURE 1. It is essential, in the practice of the present invention wherein it is desired to process multifilament yarn that a number of turns of twist be imparted to the yarns so as to give each end of the yarn a generally round cross sectional configuration prior to the first false twist operation in order that a coiled yarn in accordance with the present invention can be obtained. FIGURE 17 illustrates the angle between two ends of yarn as they are separated by each end engaging spaced apart groove guide pulleys 55 and 56 the angle being illustrated as the split-out angle $\theta$, between yarn ends Y and Y'. FIGURE 18 is a schematic illustrating the length of path and the components that constitute this length of path in the modified false twist apparatus shown in FIGURE 13. The length of path of the yarn as it emerges from the false twist spindle 52 is segment $a$ that runs up over guide pulley 85, segment $b$ between the guide pulleys 85 and 86 and segment $c$ from the second guide pulley to the point of separation. In the processing of low denier yarn it has been found that this length of path must be a minimum of 17 inches and preferably a minimum in the range of 20 to 28 inches. In the processing of high denier yarn it has been found that this length of path should be a minimum of 35 inches and more preferably a minimum in the range of 57 to 68 inches.

As heretofore stated, the present invention is particularly concerned with a method of processing thermoplastic yarns that are suitable for knitting sheer fabrics, such as ladies' sheer hosiery and the like. The number of turns of twist imparted in each of the false twisting operations, the temperature and the amount of overfeed is important, and it has been found that these factors must be carefully controlled to produce a satisfactory yarn. Specific examples which produce satisfactory yarns are set forth in Tables I, II, V and VI. Specific examples which did not produce satisfactory yarns because of excess breakage and/or failure to run are set forth in Tables III, IV, VII and VIII.

TABLE I.—LOW DENIER—YARN FIRST FALSE TWIST OPERATION

|  | 10 denier | 12 denier | 15 denier | 20 denier | 30 denier |
|---|---|---|---|---|---|
| Amount of False Twist | 126 TPI-Z | 106 TPI-Z | 106 TPI-Z | 95 TPI-Z | 85 TPI-Z. |
| Heater Block Temperature | 415° F | 415° F | 415° F | 420° F | 425° F. |
| Overfeed | 0% | 0% | 0% | 0% | 0%. |

TABLE II.—SECOND FALSE TWIST OPERATION

|  | 10 denier | 12 denier | 15 denier | 20 denier | 30 denier |
|---|---|---|---|---|---|
| Amount of False Twist | 84 TPI-S | 71 TPI-S | 71 TPI-S | 63 TPI-S | 57 TPI-S. |
| Heater Block Temperature | 355° F | 340° F | 340° F | 350° F | 360° F. |
| Overfeed | 0% | 0% | 0% | 0% | 0%. |
| Split Out Angle | 135° | 128° | 120° | 110° | 90°. |
| Length of Path | 17 in | 18 in | 19 in | 22 in | 28 in. |

TABLE III.—LOW DENIER YARN—FIRST FALSE TWIST OPERATION

|  | 10 denier | 30 denier |
|---|---|---|
| Amount of False Twist | 126 TPI-Z | 85 TPI-Z. |
| Heater Block Temperature | 415° F | 425° F. |
| Overfeed | 0% | 0% |

TABLE IV.—SECOND FALSE TWIST OPERATION

|  | 10 denier | 30 denier |
|---|---|---|
| Amount of False Twist | 84 TPI-S | 57 TPI-S |
| Heater Block Temperature | 355° F | 360° F. |
| Overfeed | 0% | 0%. |
| Split-Out Angle | 145° | 140°. |
| Length of Path | 15 in | 16 in. |

TABLE V.—HIGH DENIER YARN—FIRST FALSE TWIST OPERATION

|  | 30 denier, 10 filament | 40 denier, 7 filament | 50 denier, 17 filament | 60 denier, 20 filament | 70 denier, 17 filament | 100 denier, 34 filament |
|---|---|---|---|---|---|---|
| Turns of Real Twist | 5-S | 10-Z | 11-S | 8-Z | 15-S | 15-Z. |
| Amount of False Twist | 90 TPI-Z | 75 TPI-Z | 80 TPI-Z | 70 TPI-Z | 60 TPI-S | 60 TPI-S. |
| Heater Block Temperature | 385° F | 425° F | 400° F | 410° F | 435° F | 435° F. |
| Overfeed | 0% | 0% | 0% | 0% | 0% | 0%. |

TABLE VI.—SECOND FALSE TWIST OPERATION

|  | 30 denier, 10 filament | 40 denier, 7 filament | 50 denier, 17 filament | 60 denier, 20 filament | 70 denier, 17 filament | 100 denier, 34 filament |
|---|---|---|---|---|---|---|
| Amount of False Twist | 60 TPI-S | 50 TPI-S | 53 TPI-S | 47 TPI-S | 39 TPI-Z | 39 TPI-Z. |
| Heater Block Temperature | 350° F | 400° F | 360° F | 375° F | 445° F | 445° F. |
| Overfeed | 0% | 0% | 0% | 0% | 0% | 0%. |
| Split-Out Angle | 100° | 86° | 78° | 60° | 55° | 50°. |
| Length of Path | 40 in | 57 in | 60 in | 66 in | 70 in | 72 in. |

TABLE VII.—HIGH DENIER—YARN FIRST FALSE TWIST OPERATION

|  | 30 denier, 10 filament | 70 denier, 17 filament |
|---|---|---|
| Turns of Real Twist | 5-S | 15-Z. |
| Amount of False Twist | 90 TPI-Z | 60 TPI-S. |
| Heater Block Temperature | 385° F | 435° F. |
| Overfeed | 0% | 0%. |

TABLE VIII.—SECOND FALSE TWIST OPERATION

|  | 30 denier, 10 filament | 70 denier, 17 filament |
|---|---|---|
| Amount of False Twist | 90 TPI-S | 60 TPI-Z. |
| Heater Block Temperature | 350° F | 445° F. |
| Overfeed | 0% | 0%. |
| Split-Out Angle | 125° | 135°. |
| Length of Path | 32 in | 30 in. |

It is immaterial which direction the false twist is imparted in the first operation, as long as the false twist imparted in the second operation is in a reverse or opposite direction.

Figure 6:
FIGURE 6 is a view of the yarn shown in FIGURE 4 after the same has been immersed in boiling water for three minutes and illustrating the manner in which the size of the loops or coils is decreased and the number of coils per inch is also increased.

In order to illustrate the manner in which the elasticity of the yarns and fabric knit therefrom is fully developed when the fabrics are subjected to the usual finishing operations, relaxed skeins of the processed yarns have been immersed or dipped in boiling, 212° F., water for three minutes. The yarn shown in FIGURE 6 represents the appearance of the yarn of the present invention when its elasticity has been fully developed in hot water. As shown in FIGURE 6, the loops or coils are closer together than the coils of the yarn shown in FIGURE 4 and the coils of the yarn of FIGURE 6 are smaller than the coils of the yarn of FIGURE 4. It has been determined that 15 denier yarn, after the second false twisting operation, has an average of 75 coils per inch (FIGURE 4) and that after the elasticity of the yarn has been fully developed (FIGURE 6), there are 85 coils per inch, on the average.

Figure 11:
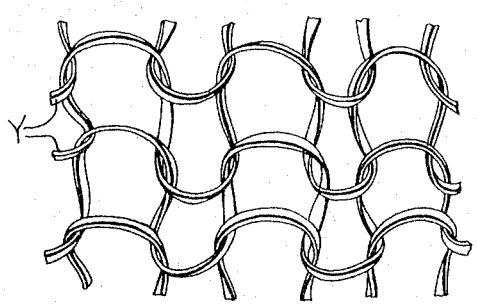
FIGURE 11 is a greatly enlarged fragmentary portion of the knit fabric illustrating the distortion of the stitch loops before the knit fabric is finished.

The fragmentary portion of fabric shown in FIGURE 11 is greatly enlarged and illustrates the appearance of the stitch loops immediately after the fabric is knit from the yarn formed in accordance with the method of the present invention and it will be noted that there is only a slight distortion of the knit stitch loops. Also, this view clearly brings out the flat nature of the low denier yarns.

Figure 12:
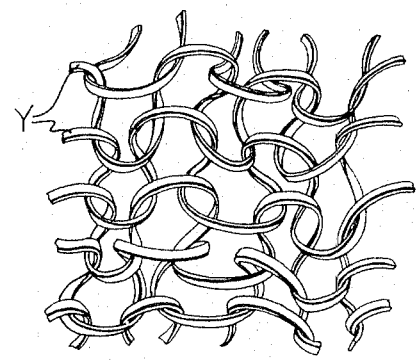
FIGURE 12 is a view similar to FIGURE 11 but illustrating the distortion of the stitch loops after the knit fabric is finished.

Referring to FIGURE 12, it will be noted that the stitch loops of the fabric are greatly distorted and the fabric has greater bulk and extensive stretchability. The fabric shown in FIGURE 12 has been subjected to the usual finishing operation which includes preboarding, dyeing, scouring and then final-preboarding and the full elasticity or distortion of the stitch loops is developed without excessive agitation of the fabric.

In the drawings and specification there has been set forth a preferred embodiment of the invention and, although specific terms are employed, they are used in a generic and descriptive sense only and not for purposes of limitation, the scope of the invention being defined in the claims.

I claim:

1. The method of producing multifilament thermoplastic yarn to produce a plurality of small closely spaced substantially uniform spring helical coils therein, the rotational direction of said coils periodically reversing along the length of the yarn to balance the overall torque of the yarn and provide a stretchable yarn suitable for single feed knitting of hosiery and the like, said method comprising the steps of:
   (a) twisting each of the ends of multifilament yarn a number of turns of twist per inch to give the yarn a substantially round configuration in cross-section,
   (b) joining the separate yarns together,
   (c) false twisting the joined together yarns with a number of turns per inch substantially in the range of 126 to 60 of the false twist in one direction while heat-setting the yarns,
   (d) subsequently false twisting the yarns a second time with a false twist means in the opposite direction while reducing the number of turns imparted by substantially one-third of the number of turns imparted in the first false twisting step and while heating the yarns in the second false twisting operation,
   (e) separating the two yarns,
   (f) taking up the separated yarns on separate bobbins.

2. The method of claim 1 wherein the turns of twist applied to each multifilament yarn in step (a) is in the range of 5 to 15 turns per inch.

3. The method of claim 1 wherein 0% overfeed is maintained in both false twist operations.

4. The method of claim 1 wherein the yarn that is false twisted in step (c) is heat set at a temperature in the range of 370° to 440° F. and the yarn that is false twisted in step (d) is heat set at a temperature in the range of 340° to 415° F.

5. The method of claim 1 wherein the denier of the yarn is in the range of 7 to 30 denier, and controlling the length of yarn path between the false twist means and the point of separation of the two yarns so as to be maintained at a minimum of 17 inches.

6. The method of claim 1 wherein the denier of the yarn is in excess of 30 denier, and controlling the length of yarn path between the false twist means and the point of separation of the two yarns so as to be maintained at a minimum of 35 inches.

7. The method of claim 1 wherein controlling the minimum length of yarn path between the false twist means and the point of separation of the two yarns so as to be in the range of 57 to 66 inches.

8. A method of processing a thermoplastic multifilament yarn in the range of 7 to 30 denier to produce a plurality of small closely spaced, substantially uniform, spring-like coils therein, the rotational direction of said coils periodically reversing along the length of the yarn to balance the overall torque of the yarn and provide a stretchable yarn suitable for single-feed knitting of hosiery and the like, said method comprising the steps of:
   (a) drawing together first and second substantially round thermoplastic yarns from separate yarn supply sources,
   (b) joining the separate yarns together,
   (c) false twisting the joined together yarns with a number of turns per inch of false twist substantially in the range of 85 to 126 in one direction while heat-setting the yarns,
   (d) subsequently false twisting the yarns a second time in the opposite direction while reducing the number of turns imparted by substantially one-third of the number of turns imparted in the first false twisting step and while heating the yarns in the second false twisting operation at a temperature lower than in the first false twisting operation,
   (e) separating the two yarns,
   (f) taking up the separated yarns on separate bobbins, wherein the angle of separation is maintained in the range of 50° to 90°.

9. The method of claim 1 wherein each end of yarn is is 15 denier, 3 filament nylon yarn.

10. The method of claim 1 wherein each end of yarn is a 40 denier, 7 filament nylon yarn.

11. The method of claim 1 further characterized in that the yarn is of a denier in the range of from 7 to 30 and the turns of false twist in step (c) are in the range of from 85 to 126 turns per inch and the turns of false twist in step (d) are in the range of from 57 to 84 turns per inch in the opposite direction.

12. The method of claim 1 further characterized in that the denier is in excess of 30 and the turns of false twist in step (c) is in the range of from 60 to 90 turns per inch and in step (d) the turns of false twist are in the range of 40 to 60 turns per inch.

13. The method of claim 1 wherein yarns are separated by being taken up on separate bobbins while controlling the angle of separation of the two yarns so as to maintain the angle in the range of 60° to 130°.

14. The method of producing thermoplastic yarn to produce a plurality of small closely spaced substantially uniform spring helical coils therein, the rotational direction of said coils periodically reversing along the length of the yarn to balance the overall torque of the yarn and provide a stretchable yarn suitable for single feed knitting of hosiery and the like, said method comprising the steps of:
   (a) joining together a pair of substantially round monofilament yarns,
   (b) false twisting the joined together yarns with a number of turns per inch substantially in the range of 126 to 60 of false twist in one direction while heat-setting the yarns,
   (c) subsequently false twisting the yarns a second time with a false twist means in the opposite direction while reducing the number of turns imparted by substantially one-third of the number of turns imparted in the first false twisting step and while heating the yarns in the second false twisting operation,
   (d) separating the two yarns,
   (e) taking up the separated yarns on separate bobbins.

15. The method of producing thermoplastic yarn to produce a plurality of small closely spaced substantially uniform spring helical coils therein, the rotational direction of said coils periodically reversing along the length of the yarn to balance the overall torque of the yarn and provide a stretchable yarn suitable for single feed knitting of hosiery and the like, said method comprising the steps of:
   (a) joining together a pair of substantially round monofilament yarns,
   (b) false twisting the joined together yarns with a number of turns per inch substantially in the range of 126 to 85 of false twist in one direction while heat-setting the yarns,
   (c) subsequently false twisting the yarns a second time with a false twist means in the opposite direction while reducing the number of turns imparted by substantially one-third of the number of turns imparted in the first false twisting step and while heating the yarns in the second false twisting operation,
(d) separating the two yarns,
(e) taking up the separated yarns on separate bobbins.

References Cited by the Examiner

UNITED STATES PATENTS

| | | | |
|---|---|---|---|
| 534,893 | 2/1895 | Lamb | 242—154 |
| 2,890,568 | 6/1959 | Willens | 57—34 X |
| 3,125,848 | 3/1964 | Baebler | 57—157 X |
| 3,137,119 | 6/1964 | Crouzet | 57—157 |
| 3,162,995 | 12/1964 | Comer et al. | 57—157 |

FOREIGN PATENTS

| | | |
|---|---|---|
| 1,082,461 | 6/1954 | France. |
| 1,197,715 | 6/1959 | France. |
| 773,816 | 5/1957 | Great Britain. |
| 788,944 | 1/1958 | Great Britain. |
| 791,610 | 3/1958 | Great Britain. |
| 892,793 | 3/1962 | Great Britain. |
| 531,033 | 7/1955 | Italy. |

MERVIN STEIN, *Primary Examiner.*